3,291,743
NEUTRALIZER COMPOSITION
John J. Bost, Sacramento, Ralph E. Bernard, Carmichael, and George R. Joiner, Rancho Cordova, Calif., assignors to Aerojet-General Corporation, Azusa, Calif., a corporation of Ohio
No Drawing. Filed Mar. 15, 1963, Ser. No. 265,351
7 Claims. (Cl. 252—149)

This invention relates to a novel neutralizer composition suitable for the neutralization of various amine type materials and their residues which remain in chemical storage tanks and in the fuel systems of liquid rocket engines.

Hydrazine, unsymmetrical dimethyl hydrazine and mixtures thereof are commonly used rocket fuels. However, these fuels are hygroscopic and in contact with air will pick up moisture to produce highly corrosive caustic solutions in the fuel system. It is not practical to completely isolate the inner passages of the engine from air while maintaining instant flight readiness as in an underground silo, for example. Therefore, residual fuel must be removed after each test firing if the engines are to have long storage life and be free from corrosion, deterioration and salt formation. Previous attempts at solving this problem, such as by purging with steam, hot air, or carbon dioxide have been found to be ineffective in completely eliminating residual fuel.

It is an object of this invention to prepare a novel neutralizer composition suitable for the neutralization of amine type residues. Another object of this invention is to prepare a neutralizer composition which possesses a high base-neutralizing capability and which is both storage stable and non-corrosive to the materials of construction. Still another object of this invention is to provide a neutralizer for use in the fuel system of rocket engines which will effectively remove amine residues from the metal surfaces thereof. These and other objects of this invention will be apparent from the detailed description which follows:

The novel neutralizer concentrate composition of this invention is shown in the following general example.

EXAMPLE I

| Ingredient: | Weight percent (Based on total weight of the concentrate) |
|---|---|
| Hydroxy acetic acid | 60–70 |
| Lower alkylene glycol, lower monoalkyl ether of a lower alkylene glycol, lower monoalkyl ether of a lower alkylene ether glycol, or mixtures thereof | 2–10 |
| Water (preferably deionized) | 20–35 |

In the neutralizer solutions of this invention, the use of hydroxy acetic acid has been found to be suitable, whereas other acids are not satisfactory due to their corrosiveness or poor solubility.

The above composition represents a neutralizer concentrate. The preparation of the neutralizer in a concentrated form provides greater convenience and cost-saving in shipping and handling.

When about one part by weight of the above composition is mixed with about 6 to 15 parts by weight of water, the resulting solution has been found to provide the combinations of effective neutralization, good rinsibility and freedom from corrosiveness that is essential to adequate removal of amine residues from metal surfaces. The treated surface is not only free from amine-residues, but contains no salts or other deposits.

In addition to the above mentioned ingredients, the compositions of this invention may optionally include corrosion inhibitors, such as 1,3-diethyl-2-thiourea in an amount up to about 1% by weight based on the total weight of the composition; wetting agents such as a copolymer of ethylene oxide and propylene oxide having a molecular weight of about 2000 in an amount up to about 1% by weight of the total composition; and anti-foaming agents such as the well-known polysiloxane emulsions. The anti-foaming agent is used in amounts up to about 0.5% by weight based on the total weight of the neutralizer composition.

In the above-mentioned formulation, the alkyl and alkylene groups are preferably the lower members of the series, and contain from 1 to about 5 carbon atoms.

The following example of one of the specific neutralizer compositions we have prepared is presented for purposes of illustration only and should not be regarded as limitative of the scope of the invention.

EXAMPLE II

| Ingredient: | Weight percent |
|---|---|
| Hydroxy acetic acid | 65.0 |
| Ethylene glycol monoethyl ether | 6.0 |
| Ethylene, oxide-propylene oxide copolymer, having a molecular weight of 2000 | 0.5 |
| 1,3-diethyl-2-thiourea | 0.5 |
| Silicon emulsion | 0.1 |
| Deionized water | 27.9 |

The above ingredients were mixed in the order given, making sure that a smooth homogeneous mixture was obtained before the addition of each succeeding ingredient. The final solution was stirred for about 10 minutes.

The physical properties of the resulting solution are as follows:
Appearance—Clear yellow liquid.
Boiling point—235° F.
Freezing point— —14° F.
Density (at 77° F.)—10.3 lbs. per gallon.

When one part of the above composition was diluted with 10 parts water, there was obtained a solution having a pH of 1.8. When this solution was used to remove the hydrazine-unsymmetrical dimethyl hydrazine residue from the fuel system of a liquid rocket engine, effective neutralization was achieved. The neutralizer composition had no noticeable effect upon the metal components of the rocket engine. When ethylene glycol and diethylene glycol monoethyl ether, respectively, are used in lieu of ethylene glycol monoethyl ether in the above formulation, satisfactory results are obtained.

Other compounds which may be used in lieu of ethylene glycol monoethyl ether, are propylene glycol, dipropylene glycol monoethyl ether and ethylene glycol monopropyl ether.

When the foregoing example is repeated using ethylene glycol and diethylene glycol monoethyl ether in lieu of ethylene glycol monoethyl ether, similar results are obtained.

The novel compositions of this invention are suitable for removing amine type materials such as hydrazine, unsymmetrical dimethyl hydrazine, and mixtures thereof from storage tanks, piping, and chemical process equipment.

Having fully described our invention, it is intended that it be limited only by the lawful scope of the appended claims.

We claim:
1. A concentrated neutralizer composition consisting essentially of from 60 to about 70% by weight of hydroxy acetic acid, about 20 to 35% by weight water, and about 2 to 10% by weight of a member selected from the group consisting of lower alkylene glycols, lower monoalkyl ethers of lower alkylene glycols, lower monoalkyl ethers of lower alkylene ether glycols, and mixtures thereof wherein the lower alkyl groups and the lower alkylene groups contain from 1 to about 5 carbon atoms.

2. The composition of claim 1 wherein there is additionally present in an amount up to about 1% by weight of a corrosion inhibitor.

3. The composition of claim 1 wherein there is additionally present in an amount up to about 1% by weight of a wetting agent.

4. The composition of claim 1 wherein there is additionally present in an amount up to about 0.5% by weight of an anti-foaming agent.

5. A neutralizer composition consisting essentially of about 65% by weight of hydroxy acetic acid, about 27.9% by weight of water, about 6% by weight of ethylene glycol monoethyl ether, about 0.5% by weight of 1,3-diethyl-2-thiourea, about 0.5% by weight of a wetting agent and about 0.1% by weight of an anti-foaming agent.

6. The method of neutralizing amine residue on metal surfaces which comprises contacting the amine residues with a neutralizer composition consisting essentially of about one part by weight of a solution containing from about 60 to about 70% by weight of hydroxy acetic acid, from about 20% by weight to about 35% by weight of water, and from about 2% by weight to about 10% by weight of a lower monoalkyl ether of a lower alkylene glycol wherein the lower alkyl and lower alkylene groups contain from 1 to about 5 carbon atoms and from about 6 to about 15 parts by weight of water.

7. The method of neutralizing amine residues on metal surfaces which comprises contacting the amine residues with a neutralizer composition consisting essentially of about one part of a solution containing from 65% by weight of hydroxy acetic acid, about 27.9% by weight of water, about 6% by weight of ethylene glycol monoethyl ether, about 0.5% by weight of 1,3-diethyl-2-thiourea, about 0.5% by weight of a wetting agent and about 0.1% by weight of an anti-foaming agent, and from about 6 to about 15 parts by weight of water.

References Cited by the Examiner

UNITED STATES PATENTS

| | | | |
|---|---|---|---|
| 2,166,476 | 7/1939 | Neilson | 252—143 |
| 2,338,689 | 1/1944 | Parker et al. | |
| 2,947,703 | 8/1960 | Larsonneur | 252—149 |
| 3,115,472 | 12/1963 | Currie | 252—321 |

FOREIGN PATENTS 502,427  3/1939  Great Britain.

OTHER REFERENCES

"Pluronics in Metal Cleaning Formulations," Wyandotte Chemical Corporation (1958), page 2.

"Pluronics in Metal Cleaning Formulations," Wyandotte Chemical Corporation (1958), pp. 1, 9 and 10 relied upon.

SAMUEL H. BLECH, *Primary Examiner.*

JULIUS GREENWALD, LEON D. ROSDOL,
*Examiners.*

W. F. SCHULZ, *Assistant Examiner.*